3,548,054
METHOD FOR IMPROVING WEIGHT GAINS AND REDUCING GROSS LESIONS IN CHICKENS EXPOSED TO MAREK'S DISEASE

Richard E. Bowen, Brandywine Township, Hancock County, and Paul V. Lake, Greenfield, Ind., assignors to Eli Lilly and Company, Indianapolis, Ind., a corporation of Indiana
No Drawing. Filed June 6, 1969, Ser. No. 831,228
Int. Cl. C12k 7/00, 9/60
U.S. Cl. 424—89      3 Claims

ABSTRACT OF THE DISCLOSURE

Methods for improving weight gains and reducing processing plant condemnations in chickens exposed to Marek's disease comprising administration of live avirulent Newcastle disease virus vaccine to young chicks.

BACKGROUND OF THE INVENTION

Marek's disease is a debilitating disease which attacks avian species and is found throughout the world wherever chickens are present. The causative agent is thought to be a virus or viruses of the herpes type. The mode of infection is believed to be through the breathing or ingestion of the virus or by transmission from the hen via the fertile egg to the embryo. The incubation period for the disease is from four to six weeks. The disease includes all acute forms of avian leukosis that are characterized by a proliferation of pleomorphic lymphocytes and plasma cells. The lesions can be found in the nervous system, the eyes, the viscera, the skeletal muscle, and the skin. Marek's disease syndrome is said by Burmester and Witter, An Outline of the Diseases of the Avian Leukosis Complex, Production Research Report No. 94, United States Department of Agriculture (USDA) (1966), to encompass such clinical conditions as fowl paralysis, range paralysis, polyneuritis, neurolymphomatosis gallinarum, visceral lymphomatosis, acute leukosis, ocular lymphomatosis and iritis. The early manifestations of the disease are apparent in such conditions as failure to gain weight, dehydration, and paralysis. The disease may result in an early or lingering death or, if the bird survives the acute phase of the disease, a regression of the symptoms may take place and the bird may recover. However, even recovered birds can contribute to substantial economic losses to the grower because they fall behind in the growth schedule. The economic loss to the poultry industry from Marek's disease is high. For example, it has been estimated that the incidence of Marek's disease in broiler flocks ranges up to 8 percent. In 1968, about 36 million broiler chickens damaged by Marek's disease were condemned in USDA-inspected processing plants. This figure represented about 48 percent of all condemnations reported in 1968 (USDA Statistical Reporting Service POW 2-1, Crop Reporting Board, Washington, D.C. 20250).

Present control procedures for Marek's disease are limited to maintenance of good hygiene and sanitation and to the genetic development of strains of disease-resistant birds. There are no known prophylactic or therapeutic methods available to protect chickens against the ravages of the disease or to cure the infection when it occurs. Therefore, the search for more effective methods for controlling Marek's disease in chickens is a continuing one.

SUMMARY

It has now been discovered that the administration of a live avirulent Newcastle disease virus vaccine parenterally to chicks from the time of hatching until the seventh day after hatching has a prophylactic effect and is effective in improving the weight gains and reducing the gross lesions in chickens exposed to Marek's disease.

DESCRIPTION OF THE PREFERRED EMBODIMENT

This invention relates to poultry husbandry. More particularly, this invention relates to compositions and methods for the use of prophylactic amounts of live avirulent Newcastle disease virus vaccine to stimulate the natural resistance of chickens to Marek's disease.

Live avirulent Newcastle disease viruses are those which do not cause the manifestation of clinical signs of the disease in chickens. Vaccines made from these avirulent viruses are presently used by poultrymen to immunize their birds against Newcastle disease and are known in at least two different forms. One of these forms is of chick embryo origin and is commonly known as the B1 strain. This strain is a live virus which was first isolated by Beaudette at the New Jersey Agriculture Experiment Station in 1946, used as a vaccine strain by Hitchner and Johnson (A Virus of Low Virulence for Immunizing Fowls Against Newcastle Disease, Veterinary Medicine, 43, 525–30 [1948]), and further characterized by Hanson and Brandley (Identification of Vaccine Strains of Newcastle Disease Virus, Science, 122, 156–7 [1955]). The strain is a natural mutant or modified virus that was found in chickens being studied by Beaudette in the process of investigations into the etiology of Newcastle disease. The B1 strain is too weak to induce the signs of Newcastle disease virus but does have the capacity to produce antibodies in the chicken, thus providing immunity to the virulent strains of the disease. Vaccines made from the B1 strain have the convenient feature of being effective in controlling Newcastle disease virus when administered to the chicken as a spray, in the drinking water, or as an intranasal or intraocular vaccination. Such vaccines are not ordinarily administered parenterally for this purpose. Seed cultures of the B1 strain can be obtained from the Newcastle Disease Virus Repository, University of Wisconsin, Madison, Wis.

The B1 strain is produced by growing the Newcastle disease virus in the chorioallantoic cavity of nine-day living embryos. Fertile chicken eggs are incubated for nine days at 37° C. and 85 percent relative humidity. On the ninth day of incubation, the eggs are removed from the incubator and candled. The air sac end of the eggs containing living embryos is punctured, and 0.2 ml. of a seed culture of the B1 strain is injected into the chorioallantoic sac and the inoculation site sealed off with a drop of collodion. The inoculated eggs are returned to the incubator and held at 37° C. and 85 percent relative humidity for a further period of three days. On the third day after inoculation, the eggs are removed from the incubator and again candled. The eggs containing living embryos are harvested by removing the allantoic and amniotic fluid with low-vacuum suction, a procedure readily understood by those skilled in the art. The average yield of fluid per harvested egg is 8 ml. The harvested fluids are pooled in quantities of varying amounts, diluted 1:1 with sterile water, and preserved by adding a mixture of penicillin G and streptomycin in an amount sufficient to provide 100 units of potassium penicillin G and 0.1 mg. of streptomycin per milliliter. The resulting solution plus a suitable stabilizer, such as an NZ-amine-sucrose menstruum described below, is filled into sterile vials and freeze-dried by conventional methods. An appropriate NZ-amine-sucrose menstruum can contain:

NZ-amine (pancreatic hydrolysate of casein which contains, in the form of mixed amino acids and peptides, all of the amino acids originally present in the casein)—160 gm.
Sucrose—160 gm.
Distilled water, q.s.—1000 ml.

Two to 8 ml. of the diluted solution are filled into a vial to provide material sufficient for 1000 vaccinations against Newcastle disease. The dried vaccine is reconstituted with sterile Sorenson's phosphate buffered saline solution prior to use.

The second form of live avirulent Newcastle disease virus vaccine is of tissue culture origin. One strain of Newcastle disease virus which can be used to produce this vaccine is known as the Bankowski strain, originally California 11914. The attenuation of this strain by serial passage in tissue culture was described in Proc. Soc. Exp. Biol. & Med., 96, 114–8 (1957). In its avirulent form, ths strain is injected intramuscularly into two- to three-week-old chicks.

The tissue culture vaccine is produced by growing the Newcastle disease virus on a pig kidney medium comprised of the diced trypsinized kidneys from a healthy pig weighing 25 to 45 pounds, and Earle's balanced salt solution with lactalbumin and bovine serum. One liter of Earle's balanced salt solution has the folowing composition.

| Ingredient: | Grams/liter |
| --- | --- |
| NaCl | 6.8 |
| KCl | 0.4 |
| $CaCl_2$ | 0.2 |
| $MgSO_4$ | 0.2 |
| $NaH_2PO_4$ | 0.125 |
| $NaHCO_3$ | 2.2 |
| Dextrose | 1.0 |
| Water, distilled, q.s | |

The medium is inoculated with a seed culture of Bankowski strain Newcastle disease virus and incubated for from about 48 to about 72 hours at 37° C. followed by an additional incubation period of from about 0 to about 24 hours at 25° C. The entire tissue culture fluid is harvested after the incubation period, and to each liter of bulk Newcastle disease virus tissue culture fluid are added 500 ml. of a stabilizing menstruum made up of:

| | Gm. |
| --- | --- |
| NZ-amine (described above) | 80 |
| Sucrose | 80 |
| Water, distilled, q.s. | |

The final bulk vaccine is filled into glass vials and freeze-dried. The dried vaccine is reconstituted with sterile Sorenson's phosphate buffered saline solution prior to use.

In the useful processes of this invention, live avirulent Newcastle disease virus vaccine can be injected either subcutaneously, intramuscularly, or intraperitoneally into the chicken from the time of hatching until the seventh day after hatching.

Chickens appear to have some natural resistance to Marek's disease, since not all chickens exposed to the disease contract the infection. Live avirulent Newcastle disease virus vaccine appears to stimulate the natural resistance forces of the chicken, thereby aiding the bird to ward off disease. It does not act directly on the virus or viruses believed to be involved in the etiology of Marek's disease, nor does it act to immunize the chicken to Marek's disease by producing antibodies to the virus. In addition, whereas live avirulent Newcastle disease virus vaccine is injected into two- to three-week-old, and older, chickens to immunize against Newcastle disease, the injection of Newcastle disease virus vaccine into one- to seven-day-old chickens generally does not immunize the bird against Newcastle disease virus because at that age the endogenous parental antibodies usually present in the chick prevent the development of antibodies from the injection of the vaccine. Surprisingly, however, live avirulent Newcastle disease virus vaccine, when employed in the manner described herein, significantly and economically improves weight gains and reduces gross lesions in chickens exposed to Marek's disease.

It has been found that, in the practice of this invention, a prophylactic dose of live avirulent Newcastle disease virus vaccine is provided when from about 0.1 to about 1.0 ml. of vaccine having a titer of from about $10^4$ to $10^8$ organisms per milliliter is administered to a young chick.

In a preferred embodiment of this invention, live avirulent Newcastle disease virus vaccine in an amount of from about 0.1 to about 1.0 ml. of a vaccine having a titer of from about $10^4$ to $10^8$ organisms per milliliter is injected subcutaneously into one- to seven-day-old chicks. Alternatively, the injection can be made either intramuscularly or intraperitoneally. A method of choice for stimulating the resistance of the chicken against the infection of Marek's disease comprises the subcutaneous injection of 0.25 ml. of a live avirulent Newcastle disease virus vaccine having a titer of $10^4$ to $10^8$ organisms per milliliter into one-day-old chicks.

The vaccine for injection can be conveniently prepared by dissolving the sterile freeze-dried live avirulent Newcastle disease virus described above in an appropriate quantity of Sorenson's phosphate buffered saline solution to provide a reconstituted solution having a titer of from $10^4$ to $10^8$ organisms per milliliter. One liter of Sorenson's phosphate buffered saline solution has the following composition.

| Ingredient: | Grams/liter |
| --- | --- |
| NaCl | 7.650 |
| $Na_2HPO_4$ | 0.767 |
| $KH_2PO_4$ | 0.172 |
| Water, distilled, g.s. | |

This invention is further illustrated by the following example:

EXAMPLE

These tests were undertaken to determine the effect on the development of Marek's disease infection in chickens of the administration of a live avirulent Newcastle virus vaccine to young chicks. A 0.25-ml. dose of vaccine having a titer of at least $10^4$ organisms per milliliter was injected intramuscularly into the breast of four-day-old leghorn chicks. Eighteen hours later each chick was injected intraperitoneally with a 0.5-ml. dose of a $10^{-2}$ dilution of whole blood from chickens known to be infected with Marek's disease. The dilution of the blood was made with Hank's balanced salt solution, one liter of which has the following composition.

| Ingredient: | Grams/liter |
| --- | --- |
| NaCl | 8.0 |
| KCl | 0.4 |
| $Na_2HPO_4 \cdot 2H_2O$ | 0.06 |
| $KH_2PO_4$ | 0.06 |
| $MgSO_4 \cdot 2H_2O$ | 0.2 |
| $CaCl_2$ | 0.14 |
| $NaHCO_3$ | 0.35 |
| Glucose | 1.0 |
| Phenol Red | 0.01 |
| Water, distilled, q.s. | |

Control groups of birds were maintained in the same facilities as the treated chickens and all chickens received the same diet through the duration of the test. Positive controls received the Marek's disease challenge but no vaccine. Negative controls received neither vaccine nor the challenge. The tests were carried out for nine weeks. At the end of each test, the birds were weighed, sacrificed, and necropsied. The three groups of treated birds gained 115, 56, and 16 percent more on the average, had 54, 50, and 83 percent fewer deaths, and showed 42, 57, and 50 percent fewer birds with lesions, respectively, than the infected controls. Table I gives he results of these tests.

or viruses believed to be involved in the etiology of Marek's disease.

2. The method of claim 1 wherein the required amount of live avirulent Newcastle disease virus vaccine is administered in a single dose.

3. The method of claim 1 wherein the required amount of live avirulent Newcastle disease virus vaccine is administered in divided doses.

TABLE I.—EFFECT ON MAREK'S DISEASE INFECTION OF LIVE AVIRULENT NEWCASTLE DISEASE VIRUS VACCINE INJECTED INTRAMUSCULARLY INTO FOUR-DAY-OLD LEGHORN CHICKS

| Source (strain) of chickens | Number of chickens in test | Live Newcastle disease virus vaccine >$10^4$, organisms/ml. | Deaths to 9 weeks | Number of chickens with lesions through 9 weeks | Average weight of chickens at 9 weeks (grams) |
|---|---|---|---|---|---|
| S13[1] | 42 | 0.25 ml. IM | 6 | 10 | [2] 530 |
| S13 | 41 | None [3] | 27 | 6 | 270 |
| S13 | 19 | 0.25 ml. IM | 4 | 3 | [2] 536 |
| S13 | 15 | None [3] | 8 | 7 | 337 |
| S13 | 20 | None [4] | 0 | 0 | 670 |
| C[5] | 16 | 0.25 ml. IM | 1 | 1 | [6] 797 |
| C | 19 | None [3] | 6 | 2 | 694 |
| C | 20 | None [4] | 0 | 0 | 844 |

[1] S13 = Eli Lilly Station Leghorn strain.
[2] Significant over positive controls ($P>.01$).
[3] Positive controls.
[4] Negative controls.
[5] C = Smitherman Leghorn strain.
[6] Significant over positive controls ($P>.05$).

What is claimed is:

1. In the method of improving weight gains and reducing gross lesions in chickens exposed to Marek's disease which comprises administering a prophylactic dose of a live avirulent virus vaccine to young chicks appearing to have some natural resistance to Marek's disease, the improvement which consists of the step wherein a live avirulent Newcastle disease virus vaccine is administered parenterally in a single or divided dose in a total amount of from about 0.1 to about 1.0 ml. of a vaccine having a titer of from about $10^4$ to about $10^8$ organisms per milliliter from not later than about the time of hatching to about seven days after hatching being the time period wherein, although the endogenous parental antibodies usually present in the chick generally prevent the development of immunity against Newcastle disease virus, the natural resistance forces of the chickens appear to be stimulated, thereby aiding the bird exposed to the disease to ward off Marek's disease without producing antibodies to the virus, in the absence of subsequent exposure to Marek's disease, and without acting directly on the virus or viruses believed to be involved in the etiology of Marek's disease.

References Cited

UNITED STATES PATENTS 3,326,767  6/1967  Holper et al. _____ 424—89

OTHER REFERENCES

Veterinary Bulletin, 38 (1968), pp. 36, 104, 163–164, 396–397, 540, 706, 876–877, abstracts No. 247, 664, 665, 666, 1052, 1053, 2361, 3238, 3239, 3240, 4225, 4226, 4227, 4228, 5129, 5130, 5131.

Churchill, A. E., et al.: Nature, 215:538–530, July 29, 1967, "Agent of Marek's Disease in Tissue Culture."

Churchill, A. E.: Res. Vet. Sci. 9(1):68–75, January 1968, "Studies on the Serological and Interferring Properties of Avian Leukosis Virus Isolated From Field Outbreaks of Disease and From Three Vaccines."

SHEP K. ROSE, Primary Examiner

U.S. Cl. X.R.

95—1.1, 1.5, 1.7, 1.8